United States Patent
Aoki et al.

(10) Patent No.: US 7,436,550 B2
(45) Date of Patent: Oct. 14, 2008

(54) IMAGE PROCESSING METHOD, IMAGE PROCESSING APPARATUS, IMAGE PROCESSING PROGRAM, PRINTER, PRINT INSTRUCTING TERMINAL, AND IMAGE PROCESSING SYSTEM

(75) Inventors: Mikio Aoki, Suwa (JP); Shinichi Arazaki, Shimosuwa-machi (JP); Yusuke Takahashi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 728 days.

(21) Appl. No.: 10/941,003

(22) Filed: Sep. 15, 2004

(65) Prior Publication Data
US 2005/0088700 A1 Apr. 28, 2005

(30) Foreign Application Priority Data
Sep. 18, 2003 (JP) ............................. 2003-326305
Jun. 8, 2004 (JP) ............................. 2004-170206

(51) Int. Cl.
*H04N 1/405* (2006.01)
(52) U.S. Cl. ...................................... 358/3.03; 358/1.9
(58) Field of Classification Search ................ 358/3.03, 358/3.04, 3.05, 1.9; 382/173, 204, 252; 708/524
See application file for complete search history.

(56) References Cited

U.S. PATENT DOCUMENTS
6,307,978 B1 * 10/2001 Metaxas .................. 382/252
7,196,821 B2 * 3/2007 Kakutani .................. 358/3.03
2003/0137698 A1 * 7/2003 Pritchard .................. 358/3.06

FOREIGN PATENT DOCUMENTS
| JP | A 6-301364 | 10/1994 |
| JP | A 9-284543 | 10/1997 |
| JP | A 11-17945 | 1/1999 |
| JP | A-2002-77612 | 3/2002 |

* cited by examiner

*Primary Examiner*—King Poon
*Assistant Examiner*—Nathan K Tyler
(74) *Attorney, Agent, or Firm*—Oliff & Berridge, PLC

(57) ABSTRACT

An image processing method, apparatus, and program as well as a printer, a print instructing terminal, and an image processing system, capable of reducing or preventing deterioration of the image quality and achieving binarization at high speeds is provided. An image processing method, by which a multi-grayscale image is divided into two regions. These regions are synthesized after error diffusion processing is applied to each region. Before the original image is divided into two regions, errors of respective pixels on a dividing line are diffused to these two regions. It is thus possible to obtain substantially the same processing result as in a case where the error diffusion processing is applied continuously across the entire original image. Hence, it is thus possible to reduce or eliminate stripes or the like in the joined portion that deteriorate the image quality when the divided regions are synthesized after the error diffusion processing, which enables a high-quality image to be obtained.

13 Claims, 11 Drawing Sheets

IMAGE PROCESSING METHOD, IMAGE PROCESSING APPARATUS, IMAGE PROCESSING PROGRAM, PRINTER, PRINT INSTRUCTING TERMINAL, AND IMAGE PROCESSING SYSTEM

BACKGROUND OF THE INVENTION

1. Field of Invention

Exemplary aspects of the present invention relate to an image processing method or the like for use in a digital printer, such as an ink jet printer and a laser printer, and an image forming apparatus, such as a digital copying machine, and more particularly to an image processing method, an image processing apparatus, an image processing program, a printer, a print instructing terminal, and an image processing system to achieve binarization of a multi-gradation image having half-tone grayscale at high speeds with the use of the error diffusion method.

2. Description of Related Art

In the related art the threshold method, the dither method, and the error diffusion method have been used to subject multi-gradation image data having half-tone grayscale, such as a full color image, to binarization.

The error diffusion method enables a pseudo half-tone grayscale image to be expressed by sequentially diffusing (distributing) an error value, which is generated when each pixel of interest undergoes binarization (for example, whether the pixel is white or black, whether the drawing takes place or not, whether toner or ink is to be ejected or not, etc.) by the threshold method, to pixels on the upper stream, specifically, to unprocessed pixels, according to a predetermined diffusion table. The diffusion processing, however, requires large information processing ability in, for example, CPU power and memories. Thus, speeding up of the processing has been a challenge.

As a method to speed up binarization with the use of the error diffusion method as described above, there is a related art method, by which a multi-gradation image to be processed is divided into several regions in advance. Then, the respective divided regions are processed in parallel. When the processing ends, all the divided regions are synthesized (joined) to a single image.

According to the method for enabling parallel processing by dividing one image as described above, however, the error diffusion processing is not applied normally to a dividing line portion. Thus, when the respective divided images are joined, discontinuous points are generated in the joined portion, and become noticeable as stripes. This poses a problem that the image quality is impaired markedly.

For example, JP-A-6-301364 aims to suppress the occurrence of stripes in the joined portion of an image by devising the diffusion method in such a manner that an input image to be processed is divided vertically in the main scanning line direction. When the error diffusion processing is applied to the respective regions in parallel, errors of pixels bordering upon the boundary line are diffused to nearby pixels in an adjacent image region with respect to these bordering pixels.

Also, JP-A-11-17945 attempts to prevent deterioration of the image quality in the joined portion of an image by further lagging the binarization in an adjacent region at least one line behind to store errors in the boundary region, so that the stored errors are diffused to pixels in the adjacent region which has not been processed yet.

Further, JP-A-9-284543 aims to make stripes in the joined portion less noticeable by processing the image regions that have undergone binarization independently to overlap, and by applying special processing to the joined portion.

SUMMARY OF THE INVENTION

In the cases of the above first and second methods, however, it is possible to reduce or suppress the occurrence of stripes by exactly diffusing errors in the vicinity of the boundary. However, because it is necessary for adjacent regions to refer to each other in regard to errors of pixels in the vicinity of the boundary, it is impossible to apply processing to the respective images by diving the processing on the hardware basis. Hence, there is a limit in speeding up.

In the case of the above third method, it is possible to reduce stripes in comparison with the conventional joining, by applying the error diffusion again to the joined region when the joining takes place. However, it is impossible to eliminate the stripes completely. Further, because image processing is applied to the joined region again after the joining, there is a problem that advantages of the dividing processing in achieving the speed up become less effective.

Exemplary aspects of the invention effectively address and/or solve the above and/or other problems, and provide a novel image processing method, image processing apparatus, image processing program, and image processing system capable of reducing or preventing, in a reliable manner, the occurrence of stripes in a joined portion that deteriorate the image quality markedly.

Further, exemplary aspects of the invention provide a novel image processing method, image processing apparatus, image processing program, and image processing system capable of achieving binarization at higher speeds than the related art methods.

First Aspect

In order to address and/or solve the above and/or other problems, an image processing method of a first exemplary aspect of the invention is an image processing method to divide an input multi-gradation original image into two regions on a boundary along an arbitrary scanning line, and synthesize the respective divided regions after error diffusion processing is applied to the respective divided regions independently. The method is characterized in that, before the original image is divided into two regions, the error diffusion processing is performed for errors of respective pixels on the scanning line to be diffused to the two regions sandwiching the scanning line. The error diffusion processing to the respective regions after the dividing, is applied to the respective divided regions, which are now divided, sequentially in parallel with the scanning line, using, a pixel sequence composed of pixels present at positions adjacent to the scanning line, and an unprocessed pixel positioned at an end portion of the pixel sequence as a start point.

As has been described, according to the method of an exemplary aspect of the invention, before the original image is divided into two regions on a boundary along an arbitrary scanning line, the error diffusion processing is applied to the respective pixels on the scanning line in advance for errors to be diffused to the two regions sandwiching the scanning line. Then the original image is divided into respective divided regions for the error diffusion processing to be performed. Thus, even though a single original image is divided and subjected to the error diffusion processing, it is possible to obtain substantially the same processing result as a case where the error diffusion processing is applied continuously across the entire original image. The occurrence of stripes or the like, in the joined portion, that deteriorate the image quality can be thereby eliminated when the divided regions are synthesized after the error diffusion processing, which in turn makes it possible to obtain a high-quality image.

Also, the error diffusion processing is applied to the respective divided regions, which are now divided, sequentially in parallel with the scanning line, using, of a pixel sequence composed of pixels present at positions adjacent to the scanning line, an unprocessed pixel positioned at an end portion of the pixel sequence as a start point. Hence, an error of a pixel of interest to be processed will not be diffused so as to be superposed on already processed pixels or the like. It is thus possible to perform satisfactory error diffusion processing.

Further, because the error diffusion processing is applied to the respective divided regions independently in parallel, the processing can be performed at higher speeds.

Second Aspect

An image processing method of a second exemplary aspect of the invention is the image processing method according to the first exemplary aspect of the invention, characterized in that one or both of the divided regions, which are now divided by 2, are divided further into two regions on a boundary along an arbitrary scanning line that extends in a direction to intersect with the dividing line. Before the dividing takes place, the error diffusion processing is performed for errors of respective pixels on the scanning line to be diffused to the two regions sandwiching the scanning line. When the error diffusion processing is applied to the divided regions independently, the error diffusion processing is performed sequentially in parallel with either dividing line, using an unprocessed pixel positioned at an intersection of the dividing lines as a start point. By secondary dividing one or both of the divided regions, which are now divided by 2, further into two regions on a boundary along an arbitrary scanning line that extends in a direction to intersect with the dividing line, and applying the error diffusion processing to the respective regions in parallel, as has been described, it is possible to perform the binarization at further higher speeds.

In this case, too, as with the foregoing description, by applying the error diffusion processing to respective pixels on the scanning line in advance before the secondary dividing, for errors to be diffused to the respective secondary divided regions, it is possible to forestall deterioration of the image quality by reducing or preventing the occurrence of stripes in the joined portion in a reliable manner, almost as with a case where the error diffusion processing is performed continuously across the entire original image.

Also, because the error diffusion processing to the respective regions is performed sequentially in parallel with either dividing line, using an unprocessed pixel positioned at the intersection of the dividing lines as a start point, an error of a pixel of interest to be processed will not be diffused so as to be superposed on already processed pixels or the like. It is thus possible to perform more satisfactory error diffusion processing.

Third Aspect

An image processing method of a third exemplary aspect of the invention is the image processing method according to the first or second exemplary aspect of the invention, characterized in that, before the error diffusion processing is applied to the respective divided regions, a processing ability of an environment where the processing is to be performed is obtained, and a dividing number and a dividing ratio of the divided regions are determined according to the processing ability.

Thus, even in a case where the processing abilities of environments where the error diffusion processing is applied to the respective divided regions are not equal and different from each other, it is possible to determine an optimal dividing number and dividing ratio of the divided regions according to the processing abilities of the environments. It is thus possible to perform efficient distributed processing according to the respective processing environments.

Fourth Aspect

An image processing method of a fourth exemplary aspect of the invention is the image processing method according to any of the first through third exemplary aspects of the invention, characterized in that, when the error diffusion processing is applied to the respective divided regions, error diffusion processing environments connected so as to enable mutual communications are used.

Thus, it is not necessary for a plurality of error diffusion processing environments to be provided within one area, apparatus or the like. Also, even when a default error diffusion processing environment, which is normally used, is unavailable or activating, it is possible to use another error diffusion processing environment via the network. An excellent availability, therefore, can be exerted.

Fifth Aspect

An image processing apparatus of a fifth exemplary aspect of the invention is an image processing apparatus that binarizes an input multi-gradation original image through error diffusion. The apparatus is characterized by including: an image dividing device to divide the original image into two regions on a boundary along an arbitrary scanning line; an error diffusing device to apply error diffusion processing independently to the respective divided regions divided by the image dividing device; and an image synthesizing device to form a binary image by synthesizing the respective regions after the error diffusion processing is applied by the error diffusing device, and characterized in that the image dividing device performs the error diffusion processing before dividing the original image, for errors of respective pixels on the scanning line to be diffused to the two regions sandwiching the scanning lines, and that the error diffusing device applies the error diffusion processing to the respective divided regions, which are now divided, sequentially in parallel with the scanning line, using, of a pixel sequence composed of pixels present at positions adjacent to the scanning line, an unprocessed pixel positioned at an end portion of the pixel sequence as a start point.

Consequently, as with the first exemplary aspect of the invention, it is possible to achieve substantially the same error diffusion processing as in a case where the error diffusion processing is applied continuously across the entire image. It is thus possible to provide a high-quality image by reducing or preventing the occurrence of stripes in the joined portion in a reliable manner.

Also, the error diffusing device performs the error diffusion processing to the respective divided regions divided by the image dividing device, sequentially in parallel with the scanning line, using an unprocessed pixel on the end portion of the line adjacent to the scanning line as a start point. Thus, an error of a pixel of interest to be processed will not be diffused so as to be superposed on already processed pixels or the like. It is thus possible to perform more satisfactory processing.

Further, because the error diffusing device applies the error diffusion processing to the respective divided regions independently with the use of another processing environment, it is possible to perform the processing at higher speeds.

Sixth Aspect

An image processing apparatus of a sixth exemplary aspect of the invention is characterized in that the image dividing device divides one or both of the divided regions, which are now divided by 2, further into two regions on a boundary along an arbitrary scanning line that extends in a direction to intersect with the dividing line. Before the dividing takes place, error diffusion processing is performed for errors of respective pixels on the scanning line to be diffused to the two regions sandwiching the scanning line. The error diffusing device, when applying the error diffusion processing to the respective divided regions independently, performs the error diffusion processing sequentially in parallel with either dividing line, using an unprocessed pixel positioned at an intersection of the dividing lines as a start point.

As has been described, the image dividing device secondary divides one or both of the divided regions further into two regions, and applies processing to the respective regions. Hence, as with the second exemplary aspect of the invention, the processing can be performed at higher speeds.

In this case, too, each error diffusing device reduces or prevents the occurrence of stripes in the joined portion in a reliable manner when the divided regions are synthesized after the error diffusion processing, by applying the error diffusion processing to the respective pixels on the scanning line in advance before the dividing, for errors to be diffused to the respective divided regions on the both sides. It is thus possible to forestall deterioration of the image quality.

Also, in this case, the error diffusion processing in each region is performed sequentially in parallel with either dividing line, using an unprocessed pixel positioned at the intersection of the dividing lines as a start point. Hence, an error of a pixel of interest to be processed will not be diffused so as to be superposed on already processed pixels or the like. It is thus possible to perform more satisfactory processing.

Seventh Aspect

An image processing apparatus of a seventh exemplary aspect of the invention is the image processing apparatus according to the fifth or sixth exemplary aspect of the invention, characterized in that two or more error diffusing devices are provided, and the error diffusion processing is applied to the respective divided regions independently by the respective error diffusing device.

Thus, it is possible to perform the error diffusion processing at higher speeds than in a case where two jobs of error diffusion processing are performed on software with the use of a single error diffusing device.

Eighth Aspect

An image processing apparatus of an eighth exemplary aspect of the invention is the image processing apparatus according to the seventh exemplary aspect of the invention, characterized in that the image dividing device obtains error diffusion processing abilities of the respective error diffusing device, and determines a dividing number and a dividing ratio of the divided regions according to the processing abilities.

Hence, as with the third exemplary aspect of the invention, even in a case where the processing abilities of environments where the error diffusion processing is applied to the respective divided regions are different from each other, it is possible to determine an optimal dividing number and dividing ratio of the divided regions according to the processing abilities of the environments. It is thus possible to perform efficient distributed processing according to the respective processing environments.

Ninth Aspect

An image processing apparatus of a ninth exemplary aspect of the invention is the image processing apparatus according to the seventh or eighth exemplary aspect of the invention, characterized in that each of the error diffusing device is connected to the image dividing device and the image synthesizing device via a network.

Hence, as with the fourth exemplary aspect of the invention, it is not necessary for a plurality of error diffusion processing environments to be provided within one area, apparatus, etc. Also, even when a default error diffusion processing environment, which is normally used, is out of order or activating, it is possible to use another error diffusion processing environment via the network. An excellent availability, therefore, can be exerted.

Tenth Aspect

An image processing program of a tenth exemplary aspect of the invention is an image processing program to binarize an input multi-gradation original image through error diffusion, characterized by causing a computer to function to include an image dividing device to divide the original image into two regions on a boundary along an arbitrary scanning line; an error diffusing device to apply error diffusion processing independently to the respective divided regions divided by the image dividing device; and an image synthesizing device to form a binary image by synthesizing the respective divided regions after the error diffusion processing is applied by the error diffusing device, the image dividing device being caused to perform, before dividing the original image, the error diffusion processing for errors of respective pixels on the scanning line to be diffused to the two regions sandwiching the scanning line, and the error diffusing device being caused to apply the error diffusion processing to the respective divided regions, which are now divided, sequentially in parallel with the scanning line, using, of a pixel sequence composed of pixels present at positions adjacent to the scanning line, an unprocessed pixel positioned at an end portion of the pixel sequence as a start point.

Thus, as with the first exemplary aspect of the invention or the like, not only can high-quality, high-speed binarization be achieved, but also these functions can be achieved on software with the use of a general computer, such as a personal computer (PC). It is thus possible to achieve these functions economically in comparison with a case where these functions are achieved by preparing specific-use hardware.

Eleventh Aspect

An image processing method of an eleventh exemplary aspect of the invention is an image processing method to mark out a multi-gradation original image into two regions on a boundary along one scanning line set at an arbitrary position, and synthesizing all of the regions after error diffusion processing is performed to each of the marked-out regions. The error diffusion processing is performed after the scanning line is determined, for errors of respective pixels on the scanning line to be diffused to the two regions sandwiching the scanning line. The error diffusion processing to each of the regions is applied to each of the regions sequentially in parallel with the scanning line, using, of a pixel sequence composed of pixels present at positions adjacent to the scanning line, an unprocessed pixel positioned at an end portion of the pixel sequence as a start point.

As has been described, according to an exemplary aspect of the invention, after the scanning line is determined, specifically, before the original image is marked out into two regions on a boundary along this arbitrary scanning line, the error diffusion processing is applied to each region after the error diffusion processing is applied to the respective pixels on the scanning line in advance, for errors to be diffused to the two regions sandwiching the scanning line. Hence, even though the error diffusion processing is applied separately to a single original image, it is possible to obtain substantially the same processing result as in a case where the error diffusion processing is applied continuously across the entire original image.

Consequently, as with the first exemplary aspect of the invention, the occurrence of stripes or the like in the joined portion that deteriorate the image quality can be reduced or eliminated when all of the divided regions are synthesized after the error diffusion processing, which in turn makes it possible to obtain a high-quality image.

Also, the error diffusion processing is applied to each of the regions sequentially in parallel with the scanning line, using, of a pixel sequence composed of pixels present at positions adjacent to the scanning line, an unprocessed pixel on the end portion of the pixel sequence as a start point. Hence, an error of a pixel of interest to be processed will not be diffused so as to be superposed on already processed pixels or the like. It is thus possible to perform more satisfactory error diffusion processing.

Further, because the error diffusion processing is applied to each of the regions independently in parallel, it is possible to perform the processing at higher speeds.

Twelfth Aspect

An image processing method of a twelfth exemplary aspect of the invention is the image processing method according to the eleventh exemplary aspect of the invention, characterized in that: if the scanning line is a first scanning line, then one or both of the regions are marked out further into two regions on a boundary along one second scanning line set at an arbitrary position to extend in a direction that intersects with the first scanning line. After the second scanning line is determined, the error diffusion processing is performed for errors of respective pixels on the second scanning line to be diffused to the two regions sandwiching the second scanning line. When the error diffusion processing is applied to each of the regions, the error diffusion processing is performed sequentially in parallel with either scanning line, using an unprocessed pixel positioned at an intersection of the first scanning line and the second scanning line as a start point.

Thus, as with the second exemplary aspect of the invention, it is possible to perform the binarization at further higher speeds.

Also, it is possible to forestall deterioration of the image quality by reducing or preventing the occurrence of stripes in the joined portion in a reliable manner, almost as with a case where the error diffusion processing is performed continuously across the entire original image.

Thirteenth Aspect

An image processing method of a thirteenth exemplary aspect of the invention is the image processing method according to the eleventh or twelfth exemplary aspect of the invention, characterized in that a processing ability of an environment where the error diffusion processing is to be performed is obtained, and the number and a ratio of the regions are determined according to the processing ability.

Hence, as with the third exemplary aspect of the invention, even in a case where the processing abilities of environments where the error diffusion processing is applied to each of the regions are not equal and different from each other, it is possible to determine optimal dividing number and dividing ratio of the regions according to the processing abilities of the environments. It is thus possible to perform efficient distributed processing according to the respective processing environments.

Fourteenth Aspect

An image processing method of a fourteenth exemplary aspect of the invention is the image processing method according to any of the eleventh through thirteenth exemplary aspects of the invention, characterized in that when the error diffusion processing is applied to each of the regions, error diffusion processing environments connected to enable mutual communications are used.

Hence, as with the fourth exemplary aspect of the invention, even when a default error diffusion processing environment, which is normally used, is unavailable or activating, it is possible to use another error diffusion processing environment via the network. An excellent availability, therefore, can be exerted.

Fifteenth Aspect

An image processing apparatus of a fifteenth exemplary aspect of the invention is an image processing apparatus that binarizes a multi-gradation original image through error diffusion, characterized by including: an image dividing device to divide the original image into two regions on a boundary along one scanning line set at an arbitrary position; an error diffusing device to apply error diffusion processing to each of the regions divided by the image dividing device; and an image synthesizing device to form a binary image by synthesizing all of the divided regions after the error diffusion processing is applied by the error diffusing device. The image dividing device performs the error diffusion processing after the scanning line is determined, for errors of respective pixels on the scanning line to be diffused to the two regions sandwiching the scanning lines; and the error diffusing device applies the error diffusion processing to each of the divided regions, which are now divided, sequentially in parallel with the scanning line, using, of a pixel sequence composed of pixels present at positions adjacent to the scanning line, an unprocessed pixel positioned at an end portion of the pixel sequence as a start point.

Hence, as with the fifth exemplary aspect of the invention, it is possible to achieve substantially the same error diffusion processing in a case where the error diffusion processing is applied continuously across the entire image. It is thus possible to provide a high-quality image by reducing or preventing the occurrence of stripes in the joined portion in a reliable manner.

Also, the error diffusing device applies the error diffusion processing to each of the divided regions divided by the image dividing device, sequentially in parallel with the scanning line, using an unprocessed pixel on the end portion of the line adjacent to the scanning line as a start point. Hence, an error of a pixel of interest to be processed will not be diffused so as to be superposed on already processed pixels or the like. It is thus possible to perform more satisfactory processing.

Further, because the error diffusion processing device is able to apply the error diffusion processing to each of the divided regions independently with the use of another processing environment, it is possible to perform the processing at higher speeds.

Sixteenth Aspect

An image processing apparatus of a sixteenth exemplary aspect of the invention is an image processing apparatus that binarizes a multi-gradation original image through error diffusion, the image processing apparatus being characterized by including: a scanning line determining device to determine one scanning line at an arbitrary position with respect to the original image; an error diffusing device to apply error diffusion processing to two regions marked out on a boundary along the one scanning line determined by the scanning line determining device; and an image synthesizing device to form a binary image by synthesizing all of the regions after the error diffusion processing is applied by the error diffusing device. The scanning line determining device performs the error diffusion processing after the scanning line is determined, for errors of respective pixels on the scanning line to be diffused to the two regions sandwiching the scanning lines. The error diffusing device applies the error diffusion processing to each of the regions sequentially in parallel with the scanning line, using, of a pixel sequence composed of pixels present at positions adjacent to the scanning line, an unprocessed pixel positioned at an end portion of the pixel sequence as a start point.

Thus, as with the fifth exemplary aspect of the invention, it is possible to achieve substantially the same error diffusion processing in a case where the error diffusion processing is applied continuously across the entire image. It is thus possible provide a high-quality image by reducing or preventing the occurrence of stripes in the joined portion in a reliable manner.

Also, the error diffusing device performs the error diffusion processing to each of the regions marked out by the scanning line determining device sequentially in parallel with the scanning line, using an unprocessed pixel on the end portion of the line adjacent to the scanning line as a start point. Hence, an error of a pixel of interest to be processed will not be diffused so as to be superposed on already processed pixels or the like. It is thus possible to perform more satisfactory processing.

Further, because the error diffusing device applies the error diffusion processing to each of the regions independently with the use of another processing environment, it is possible to perform the processing at higher speeds.

The scanning line determining device referred to herein functions in the same manner as the image dividing device referred to in the image processing apparatus according to the fifth or fifteenth exemplary aspects of the invention. However, the image dividing device includes a concept that the original image is physically divided from the scanning line, whereas the scanning line determining device excludes the concept that the original image is physically divided from the scanning line, and it indicates a concept that the original image is merely marked out on a boundary along the scanning line (the same applies to the following image processing apparatus, image processing program, etc.).

Seventeenth Aspect

An image processing apparatus of a seventeenth invention is the image processing apparatus according to the fifteenth exemplary aspect of the invention, characterized in that: if the scanning line is a first scanning line, then the image dividing device divides one or both of the regions further into two regions on a boundary along a second scanning line set at an arbitrary position to extend in a direction that intersects with the first scanning line, and after the second scanning line is set, performs the error diffusion processing for errors of respective pixels on the second scanning line to be diffused to the two regions sandwiching the second scanning line. The error diffusing device, when applying the error diffusion processing to each of the regions independently, performs the error diffusion processing sequentially in parallel with either scanning line, using an unprocessed pixel positioned at an intersection of the scanning lines as a start point.

Thus, as with the sixth exemplary aspect of the invention, it is possible to perform the binarization at higher speeds.

Also, it is possible to forestall deterioration of the image quality by reducing or preventing the occurrence of stripes in the joined portion in a reliable manner, almost as with a case where the error diffusion processing is performed continuously across the entire original image.

Eighteenth Aspect

An image processing apparatus of an eighteenth exemplary aspect of the invention is the image processing apparatus according to the fifteenth or seventeenth exemplary aspects of the invention, characterized in that two or more error diffusing devices are provided, and the error diffusion processing is applied to each of the regions independently by the respective error diffusing device.

Hence, as with the seventh exemplary aspect of the invention, it is possible to perform the error diffusion processing at higher speeds than in a case where two jobs of error diffusion processing are performed on software with the use of single error diffusing device.

Nineteenth Aspect

An image processing apparatus of a nineteenth exemplary aspect of the invention is the image processing apparatus according to the eighteenth exemplary aspect of the invention, characterized in that the image dividing device obtains error diffusion processing abilities of all of the error diffusing device, and determines a dividing number and a dividing ratio of the divided regions according to the processing abilities.

Hence, as with the eighth exemplary aspect of the invention, even in a case where the processing abilities of environments where the error diffusion processing applied to each of the divided regions are different from each other, it is possible to determine an optimal dividing number and dividing ratio of the divided regions according to the processing abilities of the environments. It is thus possible to perform efficient distributed processing according to the respective processing environments.

Twentieth Aspect

An image processing apparatus of a twentieth exemplary aspect of the invention is the image processing apparatus according to the eighteenth or nineteenth exemplary aspect of the invention, characterized in that each of the error diffusing device is connected to the image dividing device and the image synthesizing device via a network.

Thus, as with the ninth exemplary aspect of the invention, it is not necessary for a plurality of error diffusion processing environments to be provided within one area, apparatus, etc. Also, even when a default error diffusion processing environment, which is normally used, is out of order or activating, it is possible to use another error diffusion processing environment via the network. An excellent availability, therefore, can be exerted.

Twenty-First Aspect

An image processing program of a twenty-first exemplary aspect of the invention is an image processing program to binarize a multi-gradation original image through error diffusion, the image processing program being characterized by causing a computer to function to include an image dividing device to divide the original image into two regions on a boundary along one scanning line set at an arbitrary position; an error diffusing device to apply error diffusion processing to each of the regions divided by the image dividing device; and an image synthesizing device to form a binary image by synthesizing all of the divided regions after the error diffusion processing is applied by the error diffusing device. The image dividing device is caused to perform the error diffusion processing after the scanning line is determined, for errors of respective pixels on the scanning line to be diffused to the two regions sandwiching the scanning lines. The error diffusing device is caused to apply the error diffusion processing to each of the divided regions, which are now divided, sequentially in parallel with the scanning line, using, of a pixel sequence composed of pixels present at positions adjacent to the scanning line, an unprocessed pixel positioned at an end portion of the pixel sequence as a start point.

Thus, as with the first exemplary aspect of the invention or the like, it is possible to achieve high-quality, high-speed binarization. Moreover, as with the tenth exemplary aspect of the invention, these functions can be achieved on software with the use of a general computer, such as a personal computer (PC). It is thus possible to achieve these functions economically in comparison with a case where these functions are achieved by preparing specific-use hardware.

Twenty-Second Aspect

An image processing program of a twenty-second exemplary aspect of the invention is an image processing program according to the twenty-first exemplary aspect of the invention, characterized in that if the scanning line is a first scanning line, then the image dividing device is caused to divide one or both of the regions further into two regions on a boundary along a second scanning line set at an arbitrary position to extend in a direction that intersects with the first scanning line, and after the second scanning line is set, to perform the error diffusion processing for errors of respective pixels on the second scanning line to be diffused to the two regions sandwiching the second scanning line; and when applying the error diffusion processing to each of the regions independently, the error diffusing device is caused to perform the error diffusion processing sequentially in parallel with either scanning line, using an unprocessed pixel positioned at an intersection of the scanning lines as a start point.

Thus, the advantages same as those of the sixth exemplary aspect of the invention can be obtained. Also, as with the tenth exemplary aspect of the invention, these functions can be achieved on software with the use of a general computer, such as a personal computer (PC). It is thus possible to achieve these functions economically in comparison with a case where these functions are achieved by preparing specific-use hardware.

Twenty-Third Aspect

An image processing program of a twenty-third exemplary aspect of the invention is the image processing program according to the twenty-first or twenty-second exemplary aspect of the invention, characterized in that when two or more error diffusing devices are provided, the respective error diffusing devices are caused to apply the error diffusion processing to the respective regions independently.

Hence, the advantages that are the same as those of the seventh exemplary aspect of the invention can be obtained. Also, as with the tenth exemplary aspect of the invention, these functions can be achieved on software with the use of a general computer, such as a personal computer (PC). It is thus possible to achieve these functions economically in comparison with a case where these functions are achieved by preparing specific-use hardware.

Twenty-Fourth Aspect

An image processing program of a twenty-fourth exemplary aspect of the invention is the image processing program according to the twenty-first exemplary aspect of the invention, characterized in that the image dividing device is caused to obtain the error diffusion processing abilities of all the error diffusing devices, and to determine a dividing number and a dividing ratio of the divided regions according to the processing abilities.

Hence, the advantages same as those of the eighth exemplary aspect of the invention can be obtained. Also, as with the tenth exemplary aspect of the invention, these functions can be achieved on software with the use of a general computer, such as a personal computer (PC). It is thus possible to achieve these functions economically in comparison with a case where these functions are achieved by preparing specific-use hardware.

Twenty-Fifth Aspect

An image processing program of a twenty-fifth exemplary aspect of the invention is the image processing program according to the twenty-first or twenty-second exemplary aspects of the invention, characterized in that each of the error diffusing devices is connected to the image dividing device and the image synthesizing device via a network.

Hence, the advantages that are the same as those of the ninth exemplary aspect of the invention can be obtained. Also, as with the tenth exemplary aspect of the invention, these functions can be achieved on software with the use of a general computer, such as a personal computer (PC). It is thus possible to achieve these functions economically in comparison with a case where these functions are achieved by preparing specific-use hardware.

Twenty-Sixth Aspect

A computer-readable storage medium of a twenty-sixth exemplary aspect of the invention that has recorded an image processing program is a computer-readable storage medium having recorded the image processing program according to any of the tenth, twenty-first, twenty-second, twenty-third, twenty-fourth, and twenty-fifth exemplary aspects of the invention.

It is thus possible to save, assign, lend the image processing program according to any of the tenth, twenty-first, twenty-second, twenty-third, twenty-fourth, and twenty-fifth exemplary aspects of the invention in the form of a tangible material, such as a CD-ROM and a DVD-ROM.

Twenty-Seventh Aspect

A printer of a twenty-seventh exemplary aspect of the invention is characterized by having the image processing apparatus according any of the fifth, sixth, seventh, eighth, ninth, fifteenth, sixteenth, seventeenth, eighteenth, nineteenth, and twentieth exemplary aspects of the invention.

Hence, as with the first exemplary aspect of the invention or the like, it is possible to obtain high-quality binary image data in a shorter time. Also, because the binary image thus obtained can be immediately subjected to print processing with the use of its own printing function or the like, it is possible to provide the printed matter of the binary image rapidly to the user or the like.

Twenty-Eight Aspect

A print instructing terminal of a twenty-eighth exemplary aspect of the invention is a print instructing terminal to transmit a print instruction to a printer, characterized by having the image processing apparatus according to any of the fifth, sixth, seventh, eighth, ninth, fifteenth, sixteenth, seventeenth, eighteenth, nineteenth, and twentieth exemplary aspects of the invention.

Hence, as with the first exemplary aspect of the invention or the like, it is possible to obtain a high-quality binary image in a shorter time. Also, because the binary image data thus obtained can be transmitted to a predetermined printer together with a print instruction, it is possible to provide the printed matter of the binary image rapidly to the user or the like.

Twenty-Ninth Aspect

An image processing system of a twenty-ninth exemplary aspect of the invention is characterized by having the printer according to the twenty-seventh exemplary aspect of the invention and the print instructing terminal according to the twenty-eighth exemplary aspect of the inventions.

Hence, as with the first exemplary aspect of the invention or the like, it is possible to obtain high-quality binary image data in a shorter time. Also, because the binary image data thus obtained can be immediately subjected to print processing with the use of a print mechanism of the printer, it is possible to provide the printed matter of the binary image rapidly to the user or the like.

DETAILED DESCRIPTION OF EXEMPLARY EMBODIMENTS

Exemplary embodiments of the invention will now be described in detail with reference to the accompanying drawings.

Figure 1:
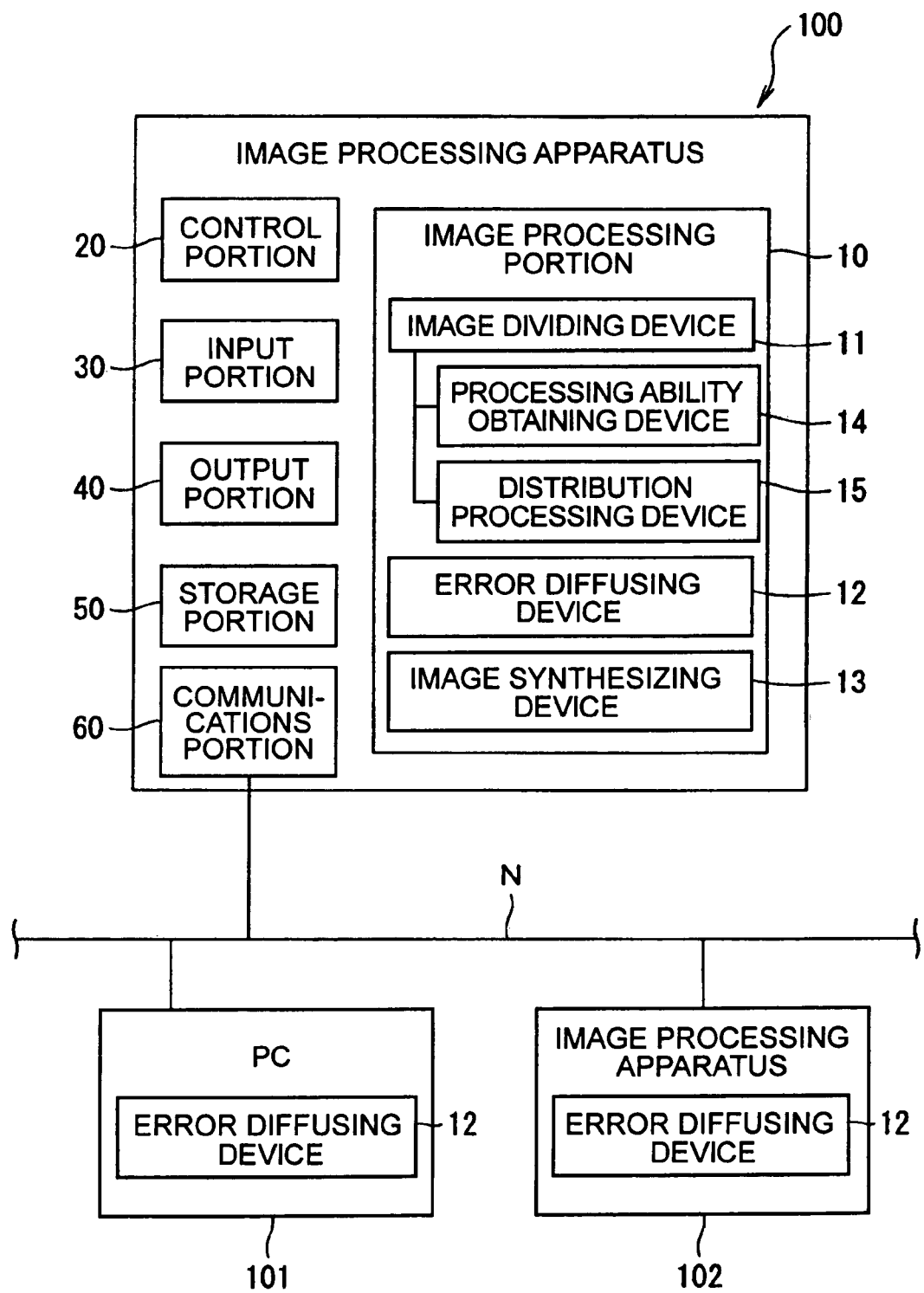
FIG. 1 is a schematic showing one exemplary embodiment of an image processing apparatus according to the invention.

FIG. 1 shows one exemplary embodiment of an image processing apparatus 100 according to the invention.

As is shown in the drawing, the image processing apparatus 100 includes, besides an image processing portion 10 forming the main portion, a control portion 20, an input portion 30, an output portion 40, a storage portion 50, and a communications portion 60, and is connected via a network N to another image processing apparatus 101, such as a personal computer (PC), and another image processing apparatus 102 equipped with separate, an independent error diffusing device to enable mutual information communications.

The network N referred to herein is not especially limited, and can be any type of network, including a local area network (LAN), such as Ethernet (registered trademark), and a wide area network (WAN), such as the ISDN (Integrated Services Digital Network) and the Internet, as well as a wireless LAN.

Also, the image processing portion 10 includes an image dividing device 11, an error diffusing device 12, and an image synthesizing device 13. Further, the image dividing device 11 is configured to include a processing ability obtaining device 14 and a distribution processing device 15.

The image dividing device 11 is to provide a function of dividing an original image G, made of a multi-gradation (for example, $2^8$=256 gradations) raster image inputted from the input portion 30, into two regions on the boundary along the main scanning line.

Figure 5:
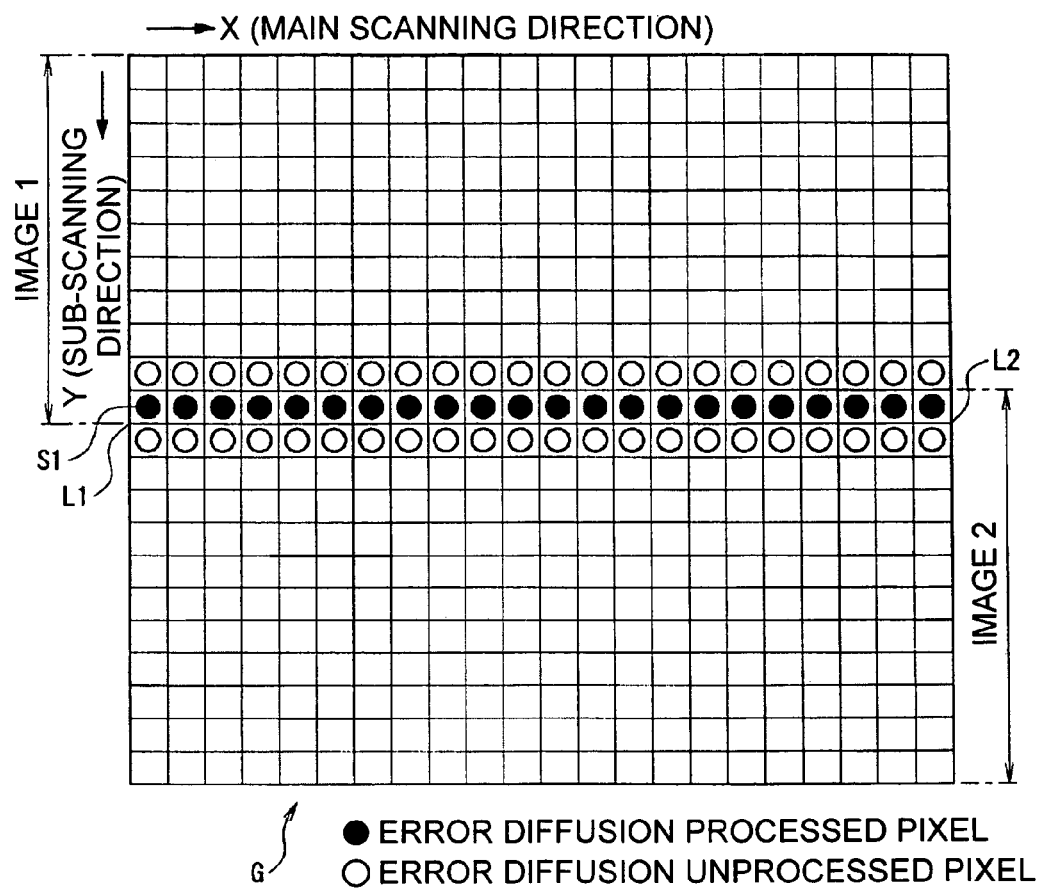
FIG. 5 is a conceptual view showing a state of an original image before it is divided by 2 and after error diffusion processing is applied.

For example, as is shown in FIG. 5, let the main scanning line direction X of the original image G made of 22×22 pixels be the horizontal direction, and the sub-scanning line direction Y be the vertical direction. Then, the original image G is divided into two regions (IMAGE 1 and IMAGE 2) above and below the main scanning line X (S1) in the middle portion. In the case of the drawing, an area (dividing) ratio of the two regions (IMAGE 1 and IMAGE 2) is 1:1. However, as will be described below, the area ratio can be set arbitrarily by moving the position of the dividing, main scanning line X upward or downward.

The image dividing device 11 is also furnished with an error diffusing function to subject respective pixels on the main scanning line X to binarization and diffusing errors of the respective pixels generated in association with the binarization to the two regions sandwiching the main scanning line X before it divides the original image G. The processing in this instance will be described concretely below.

The error diffusing device 12 is to provide a function to subject the divided regions (IMAGE 1 and IMAGE 2), which have been divided by the image dividing device 11, to binarization independently from each other by the error diffusion method. The error diffusion processing also will be described concretely below.

As the error diffusion processing method used in the exemplary aspect of the invention, three error diffusion tables (a), (b), and (c) as shown in FIG. 6 are used.

A first error diffusion table (a) is to diffuse (distribute) an error, generated when a pixel 300 of interest to be subjected to error diffusion processing undergoes binarization, to unprocessed five pixels 301, 302, 303, 304, and 305 on the periphery at their specific ratios.

For example, in the case of the drawing, the error of the pixel 300 of interest is divided by 16, and one quarter is diffused to each of the unprocessed three pixels 301, 303, and 305 adjacent to the pixel 300 of interest directly above, directly below and in the scanning direction, respectively. Then, the rest of the error is divided by 2, which are diffused to the remaining unprocessed pixels 302 and 304, respectively.

Hence, according to the error diffusion table (a), given "64" as the error of the pixel 300 of interest after binarization (when "127" is the threshold in 256 grayscales), then the error is diffused in such a manner that "16" is diffused to each of the unprocessed pixels 301, 303, and 305, and "8" to each of the remaining unprocessed pixels 302 and 304. As with the normal error diffusion processing, in a case where the initial error of the unprocessed pixel 301 is, for example, "120", it is well expected that the value exceeds the threshold ("127" herein) when "16" is given through error diffusion and changes to another value as the result of this error diffusion.

A second error diffusion table (b) is to diffuse (distribute) an error of the pixel 300 of interest after binarization to unprocessed seven pixels 301, 302, 303, 306, 307, 308, and 309 positioned on the upper stream side in the scanning (processing) direction.

That is to say, the error diffusion table (b) shows a case where scanning takes place from left to right in the main scanning direction X and from bottom to top in the sub-scanning direction Y. To be more specific, the error of the pixel 300 of interest is divided by 16, and one quarter is diffused to each of the unprocessed two pixels 301 and 303 adjacent directly above and in the scanning direction, respectively. One-eighth is diffused to each of the unprocessed three pixels 306, 302, and 309 adjacent above and below with respect to the unprocessed pixels 301 and 303. Further, one-sixteenth is diffused to each of the unprocessed two pixels 307 and 308 adjacent to the unprocessed pixel 302.

Thus, according to the error diffusion table (b), given "64" as the error of the pixel 300 of interest (when "127" is the threshold of 256 grayscales) after binarization as with the above case, then the error is diffused in such a manner that, as is shown in the drawing, "16" is diffused to each of the unprocessed pixels 301 and 303, "8" to each of the unprocessed pixels 306, 302, and 309, and "4" to each of the unprocessed pixels 307 and 308.

Also, a third error diffusion table (c) is an error diffusion pattern when the sub-scanning direction Y is downward, and is to diffuse an error vertically symmetric with respect to the second error diffusion table (b).

Thus, according to the error diffusion table (c), given "64" as the error of the pixel 300 of interest (when "127" is the threshold of 256 grayscales) after binarization as with the above cases, then the error is diffused in such a manner that "16" is diffused to each of the adjacent unprocessed pixels 303 and 305, "8" to each of the unprocessed pixels 309, 304, and 310, and "4" to each of the unprocessed pixels 311 and 312.

Now, referring to FIG. 1 again, the image synthesizing device 13 is to provide a function to form a binary image by synthesizing the respective divided regions (IMAGE 1 and IMAGE 2) after the error diffusion processing is applied by the error diffusing device 12. A synthesized image is presented visually to the user or the like by the output portion 40.

Also, the processing ability obtaining device 14 provided to the image dividing device 11 is to provide a function to obtain not only the processing ability of its own error diffusing device 12, but also processing ability information and environment information of the error diffusing device in each of the other PC 101 and image processing apparatus 102 connected via the same network N.

The term "processing ability information" referred to herein relates to a processing speed at which the error diffusion processing is performed. In a case where the connection is established via the network N, it generally means a MIPS (Million Instructions Per Second) value of a CPU (Central Processing Unit). By using the MIPS values, it is possible to compare the processing speeds directly regardless of the types of CPU. Also, when the MIPS value cannot be obtained, type and the clock number of the CPU in the environment where the processing is to be performed may be adopted as "ability information". In other words, it is possible to estimate the MIPS value from the information as to the type and the clock number of the CPU. In a case where the bus is shared, that is, in a case where hardware-based error diffusion processing is performed, "processing ability" can be judged by obtaining ID information of each of the apparatus 101, the apparatus 102, etc.

The above description described that not only the "processing ability information", but also the "environment informa-tion" is obtained to take into account the need to understand not only the mere processing ability on hardware, such as the CPU power (clock number), but also situations that vary extensively with time and the used environments, such as whether the device is actually performing any other processing and the reserved ability in such a case, etc.

The distribution processing device 15 also provided to the image dividing device 11 is to provide a function to determine a distributing number and a distributing ratio when the processing is distributed to any other error diffusing device obtained as described above. As will be described below, binarization is achieved at high speeds as the distribution processing device 15 performs optimal distribution processing. The input portion 30 is to provide a function to capture a multi-gradation original image to be processed by converting the image into quanta (digitalization). For example, it is equivalent to an image input apparatus (imaging device) capable of capturing a digital image from an analog image, such as a scanner, a digital camera, and a digital video recorder, as well as optical reading apparatus of any kind (a so-called CD-ROM drive or DVD-ROM drive) that reads a storage medium, such as a CD-ROM and a DVD-ROM, having recorded an image. When an image is transmitted via the network in the form of electric communications information, it is equivalent to a network interface (communications portion 60) or the like.

Also, the output portion 40 is to provide a function to visually present the user an input image as an image G synthesized in the image synthesizing device 13 in the image processing portion 10. For example, it can be a soft copy apparatus, such as a CRT (Cathode Ray Tube) and an LCD (Liquid Crystal Display), and a hard copy apparatus, such as a printer.

The storage portion 50 is to provide a function for saving an input/output image, an image being processed, control programs of various kinds, etc., either temporarily or fixedly (permanently). For example, it can be a rewritable storage medium of any kind, including a hard disc drive (HDD) and a semiconductor memory as well as a DVD-RW or the like having a large storage capacity.

The communications portion 60 provides an interface common to the other PC 101 and image processing apparatus 102, and connects these to enable mutual information communications by a modem, a DSU (Digital Service Unit), etc.

Figure 2:
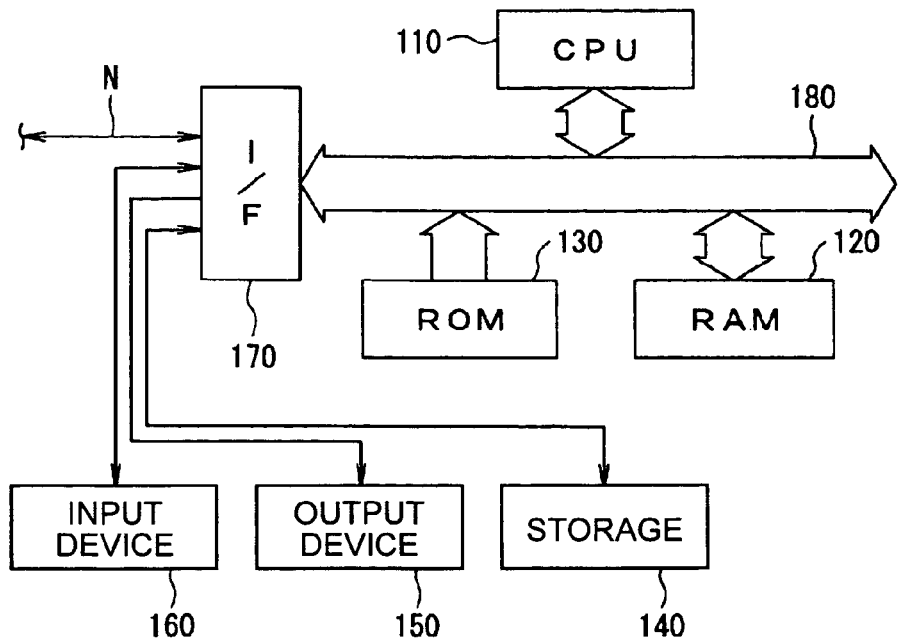
FIG. 2 is a schematic showing the hardware configuration of a PC used to achieve the image processing apparatus.
Figure 4:
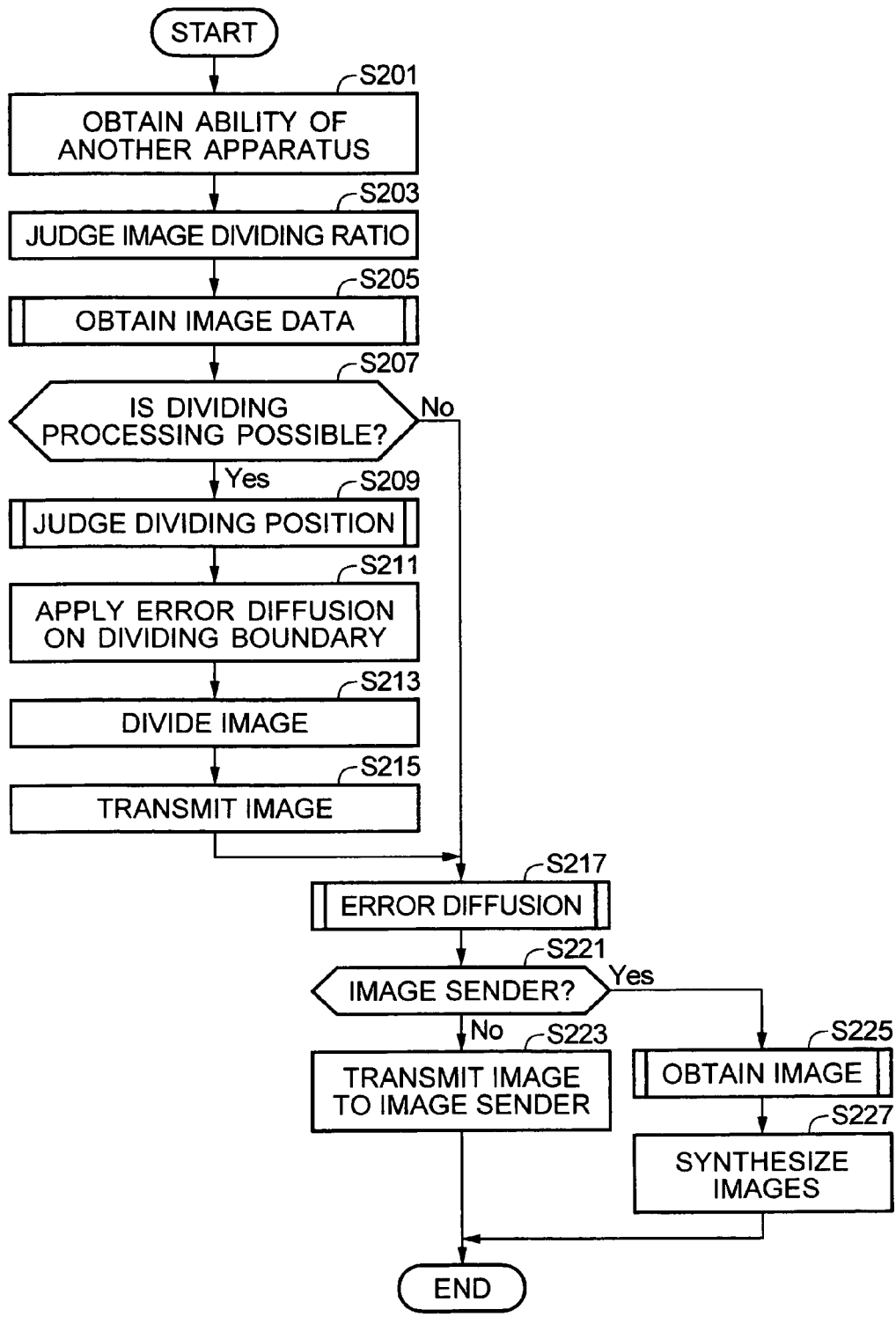
FIG. 4 is a flowchart detailing one exemplary embodiment of an image processing method according to the invention.

The image processing portion 10, the control portion 20, the input portion 30, the output portion 40, the storage portion 50, and the communications portion 60, etc. as described above that together form the image processing apparatus 100 of exemplary aspects of the invention are actually achieved by a computer system, such as a personal computer (PC), including the hardware composed of a CPU, a RAM, etc. shown in FIG. 2, and a specific computer program (software) written with an algorithm as shown in FIG. 4.

The hardware to achieve the image processing apparatus 100 includes, as is shown in FIG. 2, a CPU (Central Processing Unit) 110 serving as an arithmetic and program control responsible for the controls and arithmetic processing of various kinds, a RAM (Random Access Memory) 120 serving as a main storage, a ROM (Read Only Memory) 130 serving as a read-only storage, a secondary storage 140, such as a hard disc drive (HDD) and a semiconductor memory, an output device 150 including a monitor (an LCD (Liquid Crystal Display), a CRT (Cathode Ray Tube), etc.), an input device 160 including the aforementioned image input device, a keyboard, a mouse, etc., and an input/output interface (I/F) 170 for the foregoing, all of which are bus-connected by an internal and external bus 180 of any kind, such as a processor bus, a memory bus, a system bus, and an input/output bus, including a PCI (Peripheral Component Interconnect) bus, an ISA (Industrial Standard Architecture) bus, etc.

For example, control programs and data of various kinds, supplied from a storage medium, such as a CD-ROM, a DVD-ROM, and a flexible disc (FD), or via a communications network (LAN, WAN, Internet, etc.) N, are installed in the secondary storage 140 or the like, while the programs and the data are loaded into the main storage 120 as needed. The CPU 110 then drives resources of various kinds according to the programs loaded in the main storage 120 to execute certain control and arithmetic processing. The processing result (processed data) is outputted to the output device 150 via the bus 180 to be displayed, while the data is also stored and saved (updated) appropriately in a database formed by the secondary storage 140 as needed. The function of the image processing apparatus 100 of exemplary aspects of the invention configured as described above and the image processing method using the same, will now be described in detail primarily with reference to the flowchart of FIG. 4. In first Step S201, the image processing portion 10 (the processing ability obtaining device 14 in the image dividing device 11) of the image processing apparatus 100 of exemplary aspects of the invention first inquires the other PC 101 and image processing apparatus 102, connected to the apparatus 100 of the invention to enable information communications, about their activation statuses and the error diffusion processing abilities and obtains the relevant information.

Not only the error diffusion processing ability of another image processing apparatus 102 or the like, but also the activation load statuses are inquired. This is because it is not proper to determine the processing distributing ratio used later from the mere potential hardware-based processing ability alone to take into account an event that even when a given apparatus has a certain error diffusion processing ability, it is already performing any other processing or remains deactivated due to some trouble. Moreover, two or more error diffusion processing environments are not necessarily found in this instance, and there may be a case where only one or none of the error diffusion processing environment is found. Also, in a case where only one error diffusion processing environment is found, the environment may not be its own and it may be the environment in any other apparatus.

When the number of pieces of apparatus available for the distributed processing and their processing abilities are obtained in this manner, the image processing portion 10 proceeds to following Step S203, where the image processing portion 10 (the distribution processing device 15 in the image dividing device 11) determines the dividing ratio (dividing number and dividing ratio) of the original image G on the basis of the information thus obtained.

The dividing ratio is determined for the distributed processing to be performed most efficiently. For example, when the ratio of the information processing abilities of the image processing apparatus 100 of exemplary aspects of the invention and another apparatus is 2:1, a position achieving approximately ⅓ is determined as the image dividing position. It is thus possible to complete the error diffusion processing by the two pieces of the image processing apparatus almost concurrently, which in turn allows the divided images to be synthesized as soon as the distributed processing ends.

Also, as will be described below, in exemplary aspects of the invention, after the original image G is divided by 2, each divided image may be further divided by 2. Hence, there are three dividing numbers for the image: 2, 3, and 4. In a case where there are three pieces of the image processing apparatus, the image may be divided at a ratio of 1:2 even when the ability of each image processing apparatus capable of sharing the image processing is equal. In this case, the error diffusion processing is applied to the ⅓ region without being divided further, while the remaining ⅔ region is divided further and then the error diffusion processing is applied. The method as described above can shorten the processing time to ⅓. In any case, the image dividing device 11 determines the dividing ratio on the basis of the ability of each processing apparatus in such a manner that the overall image processing is performed in a time as short as possible.

Then, the image processing portion 10 proceeds to Step S205, and obtains the original image data to be processed, after which it proceeds to Step S207 and judges whether the dividing processing is applicable to the original image data. In a case where the dividing is possible (Yes), the image processing portion 10 directly proceeds to Step S209.

In a case where only one apparatus available for the processing is found in Step S201, the dividing processing is infeasible. Hence, the image processing portion 10 immediately skips to Step S217 and applies the error diffusion processing directly to the original image G without performing the dividing processing. However, in a case where there are two or more pieces of the apparatus available for the processing, because the dividing processing is possible, the processing portion 10 directly proceeds to Step S209 and judges the dividing position of the original image G. As has been described above, the original image data is not necessarily the data inputted from its own input portion 30, and can be the one transmitted from another apparatus or the like via the network N.

The judgment of the dividing position in Step S209 is made according to the image dividing ratio judged in Step S203.

For example, in a case where there are two environments available for the processing (error diffusion), and their processing abilities are almost equal, the original image G is divided into two regions (IMAGE 1 and IMAGE 2) for an area ratio of the respective divided regions to be 1:1, in such a manner that, as shown in FIG. 5, the regions respectively include a dividing line L1 above and a dividing line L2 below the main scanning line S1 positioned at the center in the sub-scanning direction Y while each includes the main scanning line S.

In a case where 3 or 4 is the image dividing ratio judged in Step S203, one or both of the divided regions, which have been divided by 2, are divided further into two regions on the boundary along an arbitrary scanning line S2 that extends in a direction to intersect with the dividing lines L1 and L2. When adopting the dividing method as described above, it is possible to perform effective dividing processing by avoiding inconveniences that a diffused error is diffused to a region where the processing has been already applied as will be described below.

When the dividing position is determined as described above, the error diffusion processing is then performed before the dividing is performed actually, for errors of the respective pixels on the scanning line S1 sandwiched between the dividing lines L1 and L2 to be diffused to the two regions on the both sides.

Figure 6A:
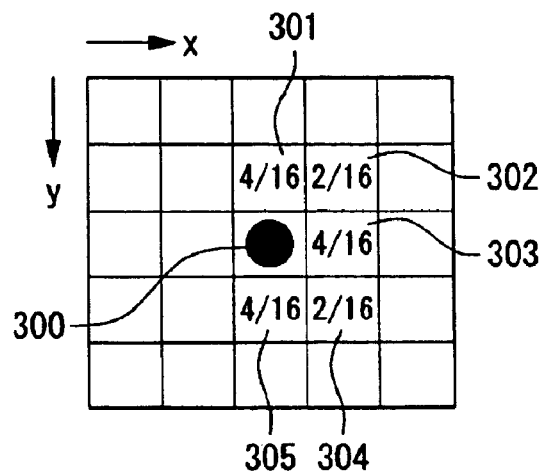
FIGS. 6A-6C are schematics showing error diffusion patterns used in the exemplary aspects of the invention.
Figure 7:
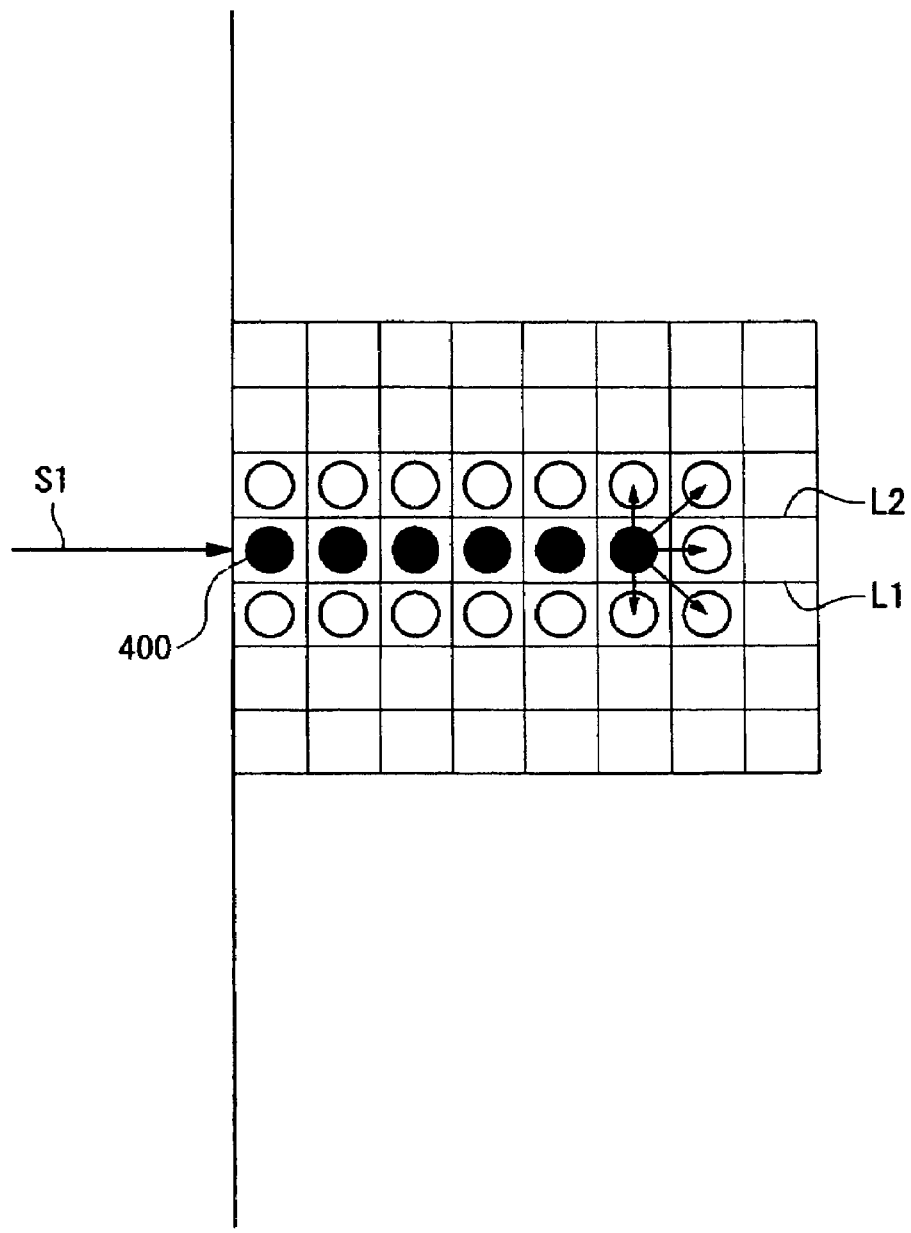
FIG. 7 is a schematic showing a state of the original image before it is divided by 2 and immediately after the error diffusion processing is started.

Specifically, with the use of the error diffusion table as is shown in FIG. 6A and FIG. 7, errors of the respective pixels on the scanning line S1 are sequentially diffused to the unprocessed pixels in IMAGE 1 above and IMAGE 2 below, using an unprocessed pixel 400 at the end portion as a start point. Referring to the drawing, a solid-filled circle (black circle) indicates a processed pixel, and a blank circle (white circle) indicates an unprocessed pixel after an error from another pixel has been diffused.

Figure 8:
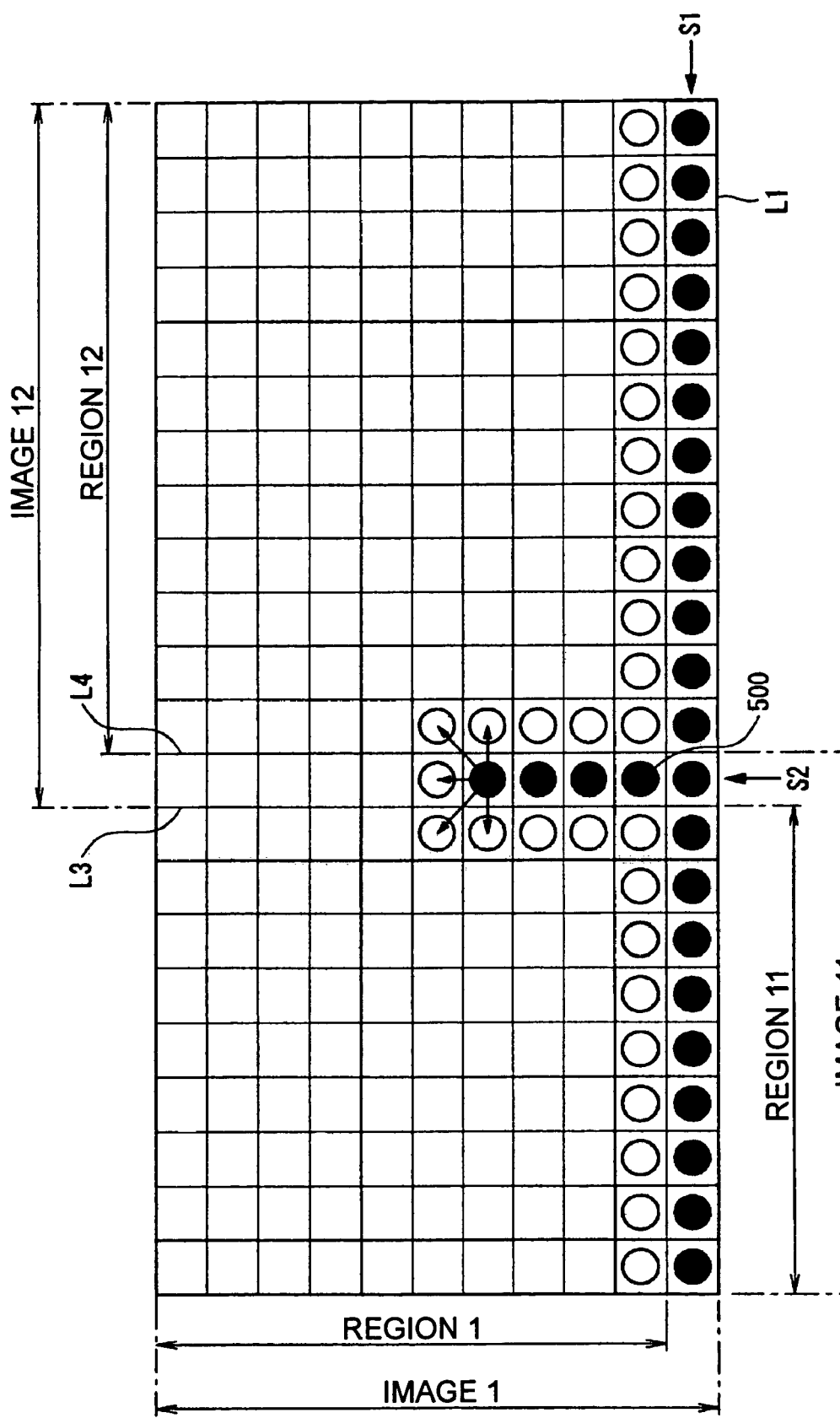
FIG. 8 is a schematic showing processing before divided images, which have been divided by 2, are further divided.

In a case where 3 or 4 is the image dividing ratio, also with the use of the error diffusion table shown in FIG. 6A, as is shown in FIG. 8, for the respective divided regions (IMAGE 11 and IMAGE 12), which have been divided by 2, errors of the respective pixels on the scanning line S2 (referred to also as the second scanning line S2), sandwiched between arbitrary dividing lines L3 and L4 and extending in a direction to intersect with the scanning line S1 (referred to also as the first scanning line S1), are sequentially diffused to unprocessed pixels of IMAGE 11 on the left and IMAGE 12 on the right, using an unprocessed pixel 500 at an end portion as a start point.

When the error diffusion processing of the respective pixels on the scanning line S1 (scanning line S2) on the dividing boundary sandwiched between the dividing lines L1 and L2 (L3 and L4) is completed as described above, the image processing portion 10 proceeds to following Step S213 to divide the original image on the dividing lines L1 and L2 (L3 and L4). The divided images are then transmitted to respective error diffusing means (environments) 12 that undertake the processing of the respective divided images (Step S215).

Figure 6B:
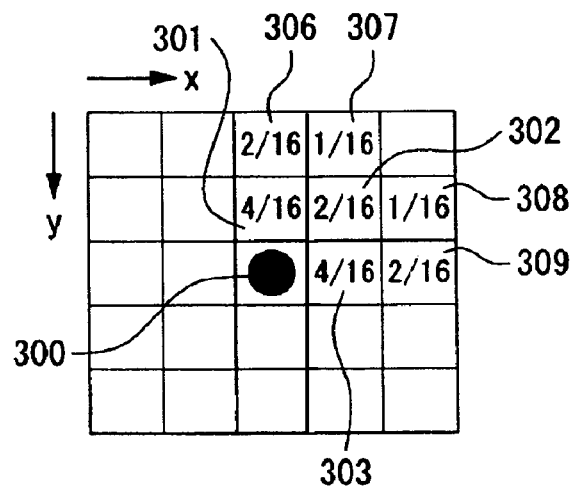
Figure 6C:
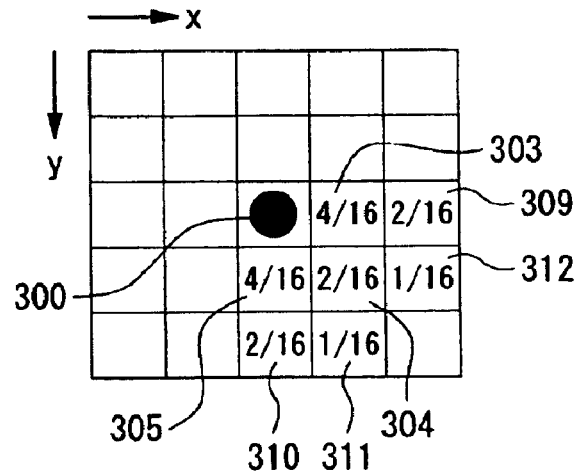

Upon receipt of the divided images transmitted as described above, in Step S217, each error diffusing device 12 applies the error diffusion processing to the assigned divided image with the use of either the error diffusion table of FIG. 6B or FIG. 6C. In this instance, the processing is started by using a position, at which an error will not be diffused to processed pixels, as a start point.

Figure 10:
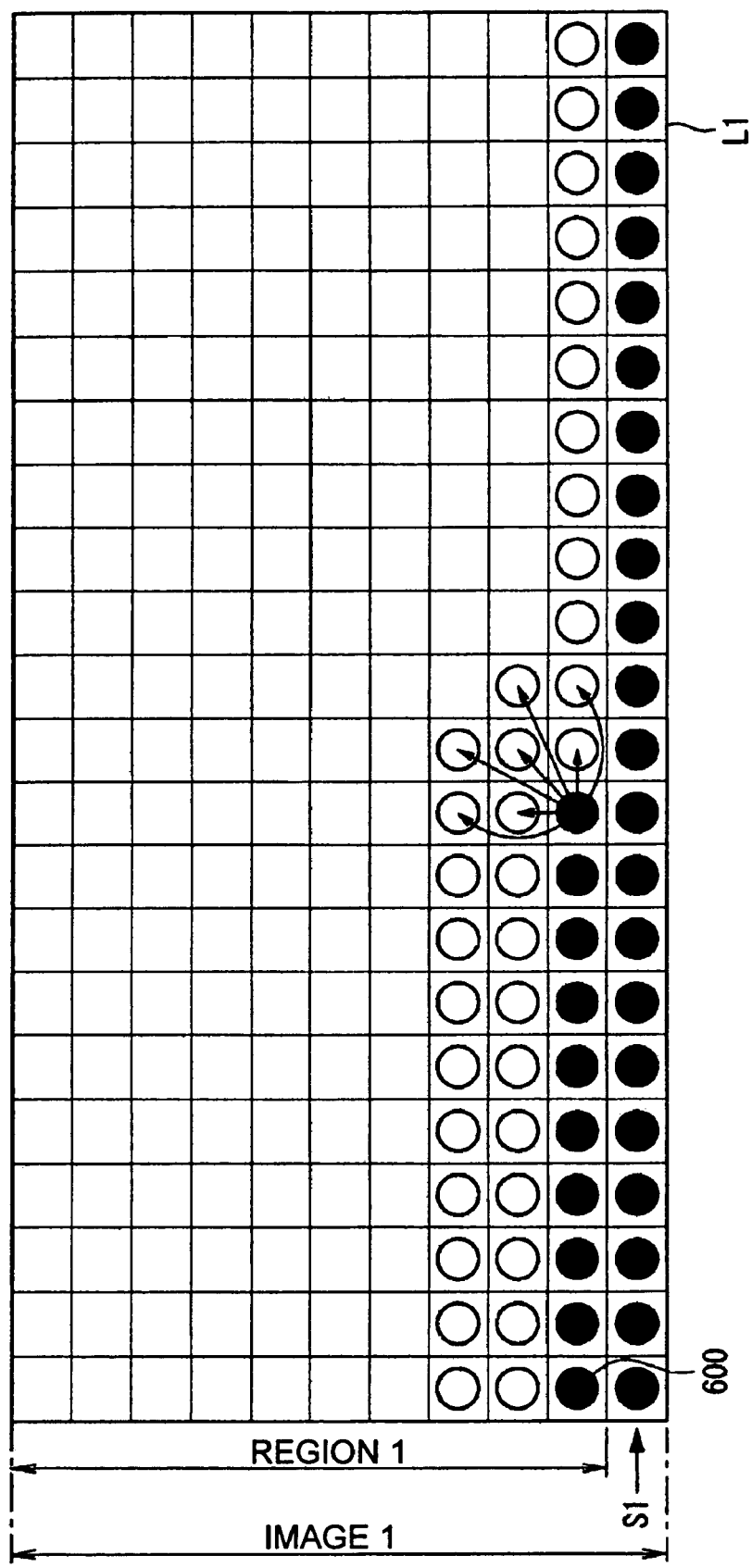
FIG. 10 is a schematic showing a state where the error diffusion processing is being applied to a divided region.

For example, in a case where the original image G is vertically divided by 2, and the error diffusion processing is applied to upper IMAGE 1, as is shown in FIG. 10, by diffusing a pixel in an upper right direction with the use of the second error diffusion table b shown in FIG. 6B, using a pixel 600 at the lower left in REGION 1, specifically, IMAGE 1 excluding the scanning line S1, as a start point, errors will not be diffused to other processed pixels even when the error diffusion processing is applied to all the pixels in the same manner. It is thus possible to perform satisfactory binarization.

Figure 11:
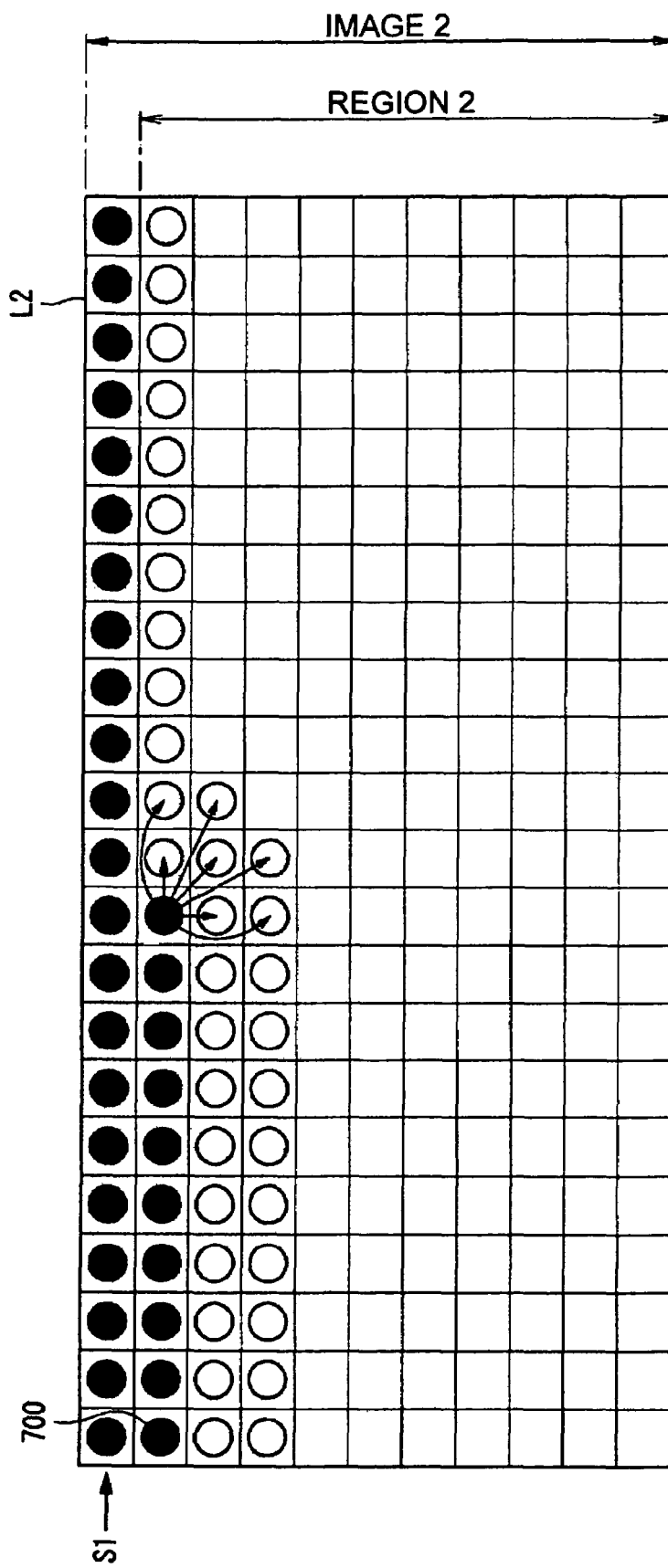
FIG. 11 is a schematic showing a state where the error diffusion processing is being applied to a divided region.

Also, in a case where the error diffusion processing is applied to lower IMAGE 2 of the original image divided by 2, as is shown in FIG. 11, by diffusing a pixel in a lower right direction with the use of the third error diffusion table c shown in FIG. 6C, using a pixel 700 at the upper left in REGION 2, that is, IMAGE 2 excluding the scanning line S1, as a start point, errors will not be diffused to other processed pixels even when the error diffusion processing is applied to all the pixels in the same manner. It is thus possible, as with IMAGE 1, to perform satisfactory binarization.

Figure 9:
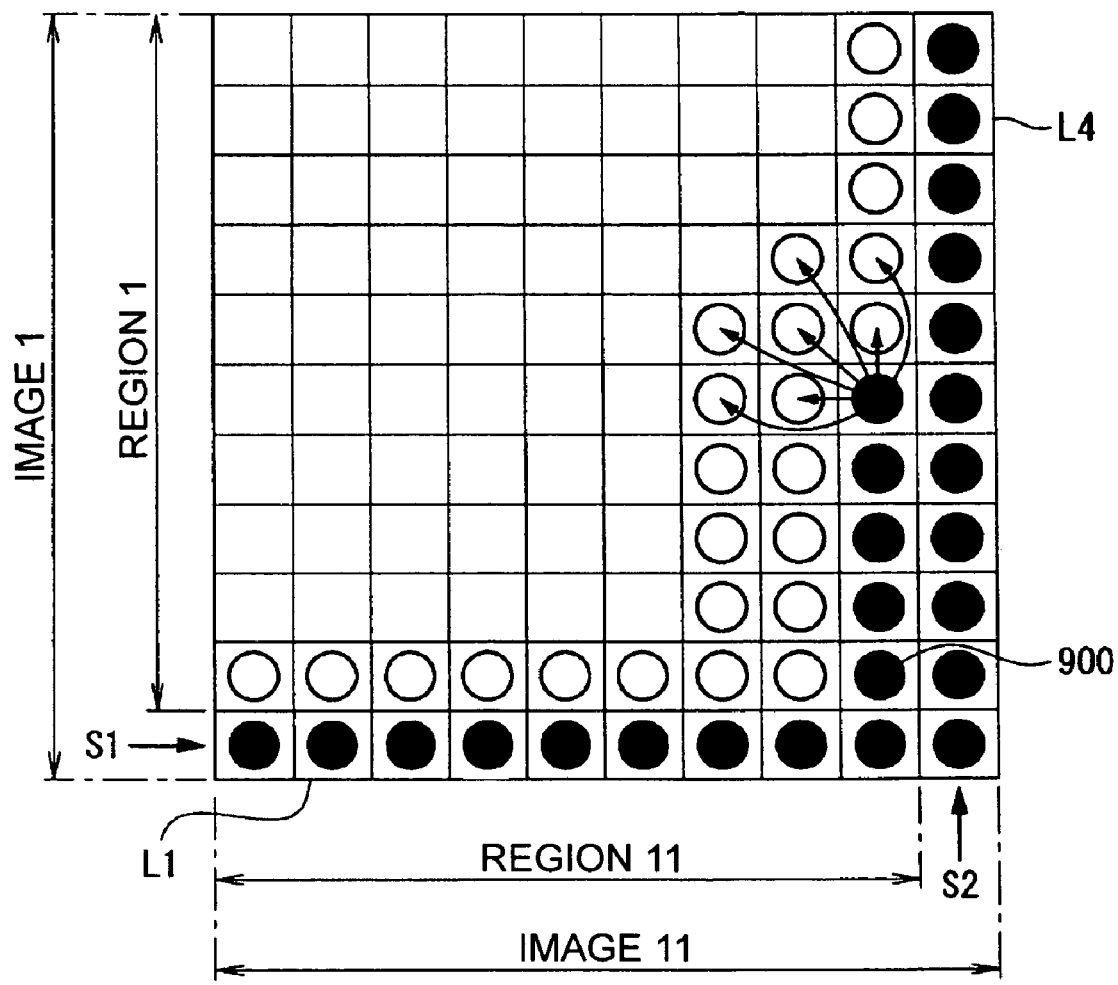
FIG. 9 is a schematic showing a state where the error diffusion processing is being applied to a divided region.

Further, in a case where the original image G is divided by 3 or 4, as is shown in FIG. 9, by performing the error diffusion processing with the use of either the error diffusion table b shown in FIG. 6B or the error diffusion table c shown in FIG. 6C, using an unprocessed pixel 900 positioned at the intersection of the scanning lines S1 and S2 as a start point, it is possible to perform the binarization in the same manner as described above. The case of FIG. 9 shows IMAGE 11 on the left when IMAGE 1, which is the upper image of the original image that has been vertically divided by 2, is further divided by 2. For IMAGE 11, the second error diffusion table b is adopted.

For IMAGE 12 that is paired with IMAGE 11, the third error diffusion table c is adopted. The third error diffusion table c is also adopted for IMAGE 21, which is an image on the left when the lower half image is further divided by 2. Further, for IMAGE 22 on the right that is paired with IMAGE 21, the second error diffusion table b is adopted. In a case where the dividing processing is judged as infeasible (No) in Step S207, the processing portion 10 immediately skips to Step S217 because there is no need to divide the image.

When the error diffusion processing is completed as has been described, each error diffusing device 12 having performed the processing proceeds to following Step S221 to judge whether the apparatus, in which the self is present, is the sender of the divided image. In a case where the apparatus is not the sender (No), that is, in a case the processing is merely undertaken on behalf of another apparatus, the error diffusing device 12 proceeds to Step S223, and transmits the processed image to the image processing apparatus 100 as the image sender, upon which the processing is completed.

In this instance, the image transmitted to the image processing apparatus 100 as the image sender is not necessarily a divided image, and it may be a single original image G. For example, there may be a case where the error diffusing device 12 in the apparatus 100 as the image sender is activating for any other processing, so that another error diffusing device 12 undertakes the entire processing.

In a case where it is judged that the image processing apparatus 100, in which the self is present, is the image sender, the error diffusing device 12 proceeds to Step S225, and obtains via the network N all the processed images assigned to any other error diffusing device 12. The image processing portion 10 then proceeds to following Step S227, and synthesizes these images. The processing is completed when the synthesized image is transmitted later to the output portion 40. In this instance, in a case where the obtained image is a single image that has not been divided from the start, it goes without saying that Step S227 is skipped and the processing is completed. Also, it is needless to say that when the respective divided images are synthesized, they are synthesized so that the pixels on the respective dividing lines L1, L2, L3, and L4 will not overlap by discarding the pixels on either line.

As has been described, according to exemplary aspects of the invention, before the original image G is divided into two regions on the boundary along an arbitrary scanning line S, the error diffusion processing is applied to the respective pixels on the scanning line S in advance for errors to be diffused to the two regions sandwiching the scanning line, then the original image G is divided, and the error diffusion processing is applied to each. Hence, even though the error diffusion processing is performed by dividing a single original image, it is possible to obtain substantially the same processing result as in a case where the error diffusion processing is applied continuously across the entire original image.

As a consequence, it is possible to eliminate the occurrence of stripes or the like in the joined portion that deteriorate the image quality when the divided regions are synthesized after the error diffusion processing, and a high-quality image can be thereby obtained at high speeds. Hence, by applying the exemplary method of the invention as described above to a digital printer, such as an ink jet printer and a laser printer, and an image forming apparatus that uses raster data, such as a digital copying machine, it is possible to provide high-quality (binary) printed matter having no stripes within a printed image at high speeds.

In a typical color ink jet printer, for example, 8-bit (256 grayscales) input data for R (red), G (green), and B (blue) are converted to binary raster data, for example, for four kinds of ink (C (cyan), M (magenta), Y (yellow), and K (black)), and whether ink is to be ejected or not is determined on the basis of the converted data.

Hence, when the binarization is performed by dividing an image by a related art method, discontinuous processing is performed in the joined portion, and ejection of ink becomes inhomogeneous, which gives rise to stripes that deteriorate the image quality.

Because the invention is devised in such a manner that the error diffusion processing is applied to the joined portion in advance before the dividing takes place, the ejection of ink becomes homogeneous across the entire divided images, and no ugly stripes will occur in the joined portion. It is thus possible to provide high-quality printed matter.

The error diffusion tables used in this exemplary embodiment are part of examples, and for instance, various patterns, including the diffusion patterns currently used in many cases, such as a Javis-Judice-Ninke type, a Floyd-Steinberg type, and a Shiau-Fan type, can be used as well.

It should be noted, however, that the dividing number of exemplary aspects of an original image of the invention is any of 2, 3 and 4, and the image cannot be divided by 5 or greater. Also, the dividing pattern is to divide an image by 2, either vertically or horizontally, and then the respective divided region is divided by 2 to intersect with the dividing line. Any other dividing pattern cannot be applied.

The reason for this is, as has been described above, to reduce or prevent errors from being diffused to processed pixels when the original image is subjected to dividing processing, and such prevention cannot be achieved by any other dividing patterns.

Hence, it should be noted that in a dividing pattern to divide an original image into three regions in parallel horizontally, or to divide an original image into two regions and divide each further into three regions, the error diffusion processing as satisfactory as the invention cannot be performed.

Also, in this exemplary embodiment, another error diffusing device 12 is connected via the network N. It should be appreciated, however, that the invention is not limited to this configuration, and for example, another error diffusing device may be the one within the same apparatus, sharing the bus or the memory.

The mode of the available distributed processing of the invention is not especially limited, either. A typical mode of the distributed processing is, when the image processing apparatus 100 of the invention may be a PC, distribution between the PC and another PC, and when the PC serves also as a print instructing apparatus, distribution between the print instructing apparatus and a printer. Also, when the image processing apparatus of an exemplary aspect of the invention is provided in the printer, a typical mode of distributed processing would be distribution between the computer system (error diffusion by software) and an ASIC for error diffusion processing in the printer, as well as distribution between the printer and a plurality of other printers. In particular, when the binary data obtained in the image processing apparatus 100 of an exemplary aspect of the invention is directly outputted by printing on a printing sheet of paper, by providing the image processing apparatus 100 to the printer, it is possible to save the time needed to transmit the binary data via the network N, which in turn makes it possible to provide the printed matter of the binary image to the user or the like in a shorter time.

Also, as has been described, all the devices of the invention can be achieved by software using the computer system, such as a PC. Of all these devices, when the error diffusing device 12 is achieved by hardware, such as the ASIC (Application Specific Integrated Circuit) for error diffusion processing, it is possible to achieve the binarization at higher speeds.

Figure 3:
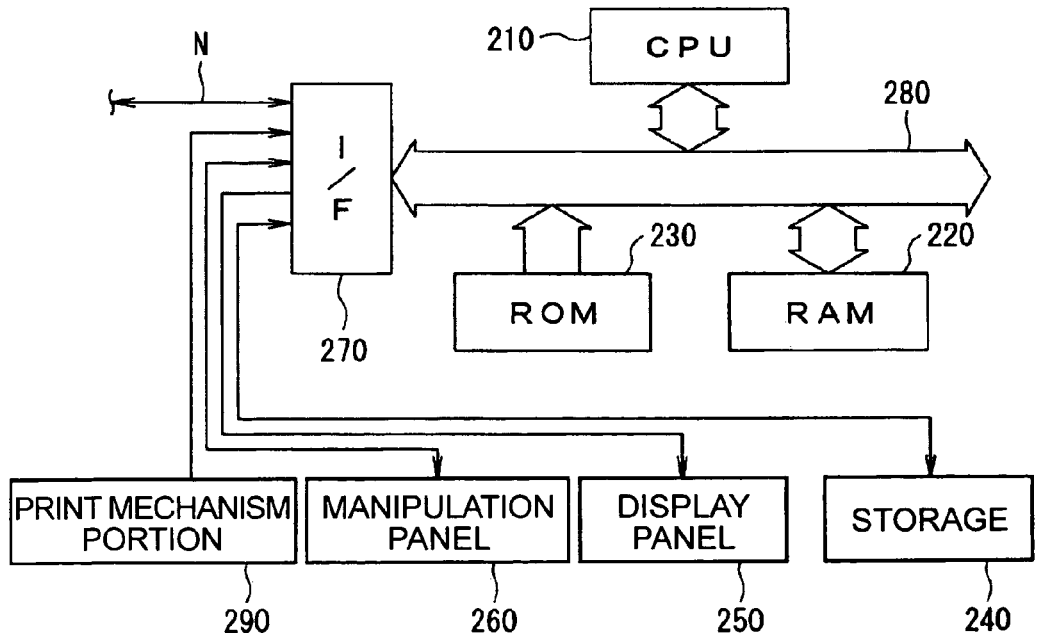
FIG. 3 is a schematic showing the hardware configuration of a printer used to achieve the image processing apparatus.

FIG. 3 shows one example of the hardware configuration of a printer equipped with the image processing apparatus 100 of exemplary aspects of the invention. A CPU 210, a RAM 220, and a ROM 230 are interconnected via a bus 280, and the CPU 210, the RAM 220, the ROM 230, a storage 240, a display panel 250, a manipulation panel 260, a print mechanism portion 290, a network N, etc. are connected via an interface 270 so as to enable mutual information communications.

Programs of various kinds installed in the storage 240 or the like directly via the network N or via a storage medium by a drive of any kind, or programs of various kinds stored in the ROM 230 are loaded into the RAM 220 at turn-on. Then, the image processing of exemplary aspects of the invention as described above can be achieved as the CPU 210 sequentially executes program instructions loaded in the RAM 220.

Figure 12:
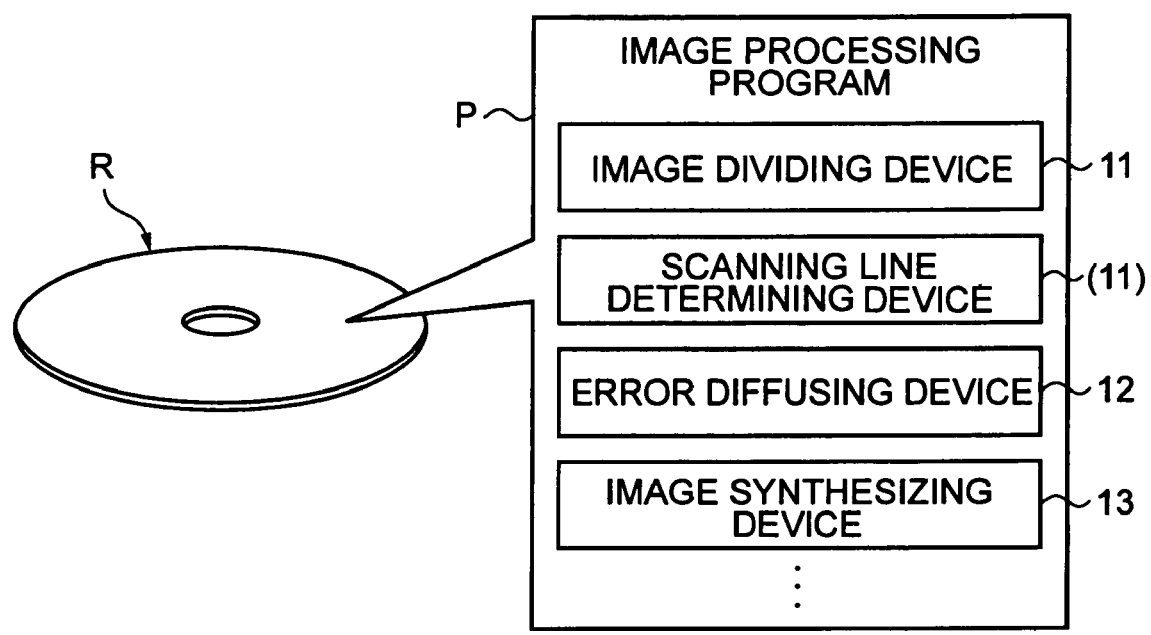
FIG. 12 is a schematic showing one example of a computer-readable recording medium having recorded an image processing program.

The storage medium referred to herein means a semiconductor storage medium, such as a RAM and a ROM, a magnetic memory type storage medium, such as an FD and an HD, an optical read storage medium, such as a CD, a CDV, an LD, and a DVD, and magnetic memory/optical read storage medium, such as an MO, and includes any type of storage medium provided that it is a computer-readable storage medium regardless of whether the read method is an electronic, magnetic, or optical method. FIG. 12 shows a CD-ROM, which is a computer-readable storage medium R, and it shows that an image processing program P to achieve the invention with the use of a computer system is recorded in the storage medium R including the CD-ROM.

The protocol for communications between the apparatus 100 of exemplary aspects of the invention and any other processing apparatus 101 or 102 or the like, to which the distributed processing is assigned, is not especially limited. When the network N establishing the connection is the Internet, standard TCP/IP (Transmission Control Protocol/Internet Protocol) can be used. When the network N is a LAN structured by a specific vender, specific protocols, such as AppleTalk/EtherTalk (registered trademark), NetBEUI/NetBIOS (registered trademark), and SPX/IPX (registered trademark), can be used.

For example, for TCP/IP, the followings are available: TCP (Transmission Control Protocol) to ensure reliable communications by establishing connections among respective pieces of apparatus; UDP (User Datagram Protocol), which is a connection-less protocol, to provide efficient communications; IP (Internet Protocol), which is a protocol to transmit packets to a specific destination from a number of routes; Telnet (Telecommunication Network), which is a protocol to control the other terminal remotely via the network; FTP (File Transfer Protocol), which is a protocol to execute file transfer with the use of Telnet; NFS (Network File System), which is a protocol to provide a client apparatus 100 with transmission file access function to another computer in a printing apparatus 200; SNMP (Simple Network Management Protocol), which is a protocol to exchange network management information, such as failure information and traffic information; ARP and RARP (Address Resolution Protocol, Reverse ARP); SLIP and PPP (Serial Line Protocol, Point-to-Point Protocol); RIP and OSPF (Routing Information Protocol, Open Shortest Path First); RSVP (Resource Reservation Protocol); IPSec (IP security Protocol); IGMP (Internet Group Management Protocol); NTP (Network Time Protocol), etc.

What is claimed is:

1. An image processing method to mark out a multi-gradation original image into two regions on a boundary along one scanning line set at an arbitrary position, and to synthesize all of the regions after error diffusion processing is applied to each of the marked-out regions, the image processing method comprising:

performing the error diffusion processing after the scanning line is determined, for errors of respective pixels on a scanning line to be diffused to two regions sandwiching the scanning line to be diffused, the scanning line including one or more pixels; and applying the error diffusion processing in each of the two regions to each of the two regions sequentially in parallel with the scanning line to be diffused, using, of a pixel sequence including pixels present at positions adjacent to the scanning line to be diffused, an unprocessed pixel positioned at an end portion of the pixel sequence as a start point, wherein if the scanning line to be diffused is a first scanning line, then one or both of the two regions are marked out further into two regions on a boundary along one second scanning line set at an arbitrary position to extend in a direction that intersects with the first scanning line, and after the second scanning line is determined, performing the error diffusion processing for errors of respective pixels on the second scanning line to be diffused to two regions sandwiching the second scanning line, the first scanning line including one or more pixels and the second scanning line including one or more pixels, and when the error diffusion processing is applied to each of the two regions sandwiching the second scanning line, performing the error diffusion processing sequentially in parallel with either scanning line, using an unprocessed pixel positioned at an intersection of the first scanning line and the second scanning line as a start point.

2. The image processing method according to claim 1, further comprising:
obtaining a processing ability of an environment where the error diffusion processing is to be performed, and determining the number and a ratio of the regions according to the processing ability.

3. The image processing method according to claim 1, wherein:
when the error diffusion processing is applied to each of the regions, error diffusion processing environments connected to enable mutual communications are used.

4. An image processing apparatus that binarizes a multi-gradation original image through error diffusion, comprising:
an image dividing device to divide the original image into two regions on a boundary along one scanning line set at an arbitrary position, the scanning line including one or more pixels;
an error diffusing device to apply error diffusion processing to each of the regions divided by the image dividing device; and
an image synthesizing device to form a binary image by synthesizing all of the divided regions after the error diffusion processing is applied by the error diffusing device,
the image dividing device performing the error diffusion processing after the scanning line is determined, for errors of respective pixels on the scanning line to be diffused to two regions sandwiching the scanning line; and
the error diffusing device applying the error diffusion processing to each of the divided regions, which are now divided, sequentially in parallel with the scanning line, using, of a pixel sequence including pixels present at positions adjacent to the scanning line, an unprocessed pixel positioned at an end portion of the pixel sequence as a start point, wherein
if the scanning line is a first scanning line, then the image dividing device divides one or both of the regions further into two regions on a boundary along a second scanning line set at an arbitrary position to extend in a direction that intersects with the first scanning line, and, after the second scanning line is determined, performs the error diffusion processing for errors of respective pixels on the second scanning line to be diffused to the two regions sandwiching the second scanning line, the first scanning line including one or more pixels and the second scanning line including one or more pixels, and
the error diffusing device, when applying the error diffusion processing to each of the regions independently, performs the error diffusion processing sequentially in parallel with either scanning line, using an unprocessed pixel positioned at an intersection of the scanning lines as a start point.

5. An image processing apparatus that binarizes a multi-gradation original image through error diffusion comprising:
a scanning line determining device to determine one scanning line at an arbitrary position with respect to the original image, the scanning line including one or more pixels;
an error diffusing device to apply error diffusion processing to two regions marked out on a boundary along the one scanning line determined by the scanning line determining device; and
an image synthesizing device to form a binary image by synthesizing all of the regions after the error diffusion processing is applied by the error diffusing device,
the scanning line determining device performing the error diffusion processing after the scanning line is determined, for errors of respective pixels on the scanning line to be diffused to the two regions sandwiching the scanning lines; and
the error diffusing device applying the error diffusion processing to each of the regions sequentially in parallel with the scanning line, using, of a pixel sequence including pixels present at positions adjacent to the scanning line, an unprocessed pixel positioned at an end portion of the pixel sequence as a start point, wherein
if the scanning line to be diffused is a first scanning line, then one or both of the two regions are marked out further into two regions on a boundary along one second scanning line set at an arbitrary position to extend in a direction that intersects with the first scanning line, and after the second scanning line is determined, performing the error diffusion processing for errors of respective pixels on the second scanning line to be diffused to two regions sandwiching the second scanning line, the first scanning line including one or more pixels and the second scanning line including one or more pixels, and
when the error diffusion processing is applied to each of the two regions sandwiching the second scanning line, performing the error diffusion processing sequentially in parallel with either scanning line, using an unprocessed pixel positioned at an intersection of the first scanning line and the second scanning line as a start point.

6. The image processing apparatus according to claim 4, wherein:
two or more error diffusing devices are provided, and the error diffusion processing is applied to each of the regions independently by the respective error diffusing device.

7. The image processing apparatus according to claim 6:
the image dividing device obtaining error diffusion processing abilities of all of the error diffusing device, and determining a dividing number and a dividing ratio of the divided regions according to the processing abilities.

8. The image processing apparatus according to claim 6, wherein:

each of the error diffusing devices is connected to the image dividing device and the image synthesizing device via a network.

9. A computer readable medium having an image processing program recorded thereon that causes a computer to binarize a multi-gradation original image through error diffusion, the image processing program comprising:

an image dividing step to divide the original image into two regions on a boundary along one scanning line set at an arbitrary position, the scanning line including one or more pixels, an error diffusing step to apply error diffusion processing to each of the regions divided by the image dividing step; and an image synthesizing step to form a binary image by synthesizing all of the divided regions after the error diffusion processing is applied by the error diffusing step, the image dividing step performing the error diffusion processing after the scanning line is determined, for errors of respective pixels on the scanning line to be diffused to the two regions sandwiching the scanning line, and the error diffusing step applying the error diffusion processing to each of the divided regions, which are now divided, sequentially in parallel with the scanning line, using, of a pixel sequence including pixels present at positions adjacent to the scanning line, an unprocessed pixel positioned at an end portion of the pixel sequence as a start point, wherein if the scanning line to be diffused is a first scanning line, then one or both of the two regions are marked out further into two regions on a boundary along one second scanning line set at an arbitrary position to extend in a direction that intersects with the first scanning line, and after the second scanning line is determined, performing the error diffusion processing for errors of respective pixels on the second scanning line to be diffused to two regions sandwiching the second scanning line, the first scanning line including one or more pixels and the second scanning line including one or more pixels, and when the error diffusion processing is applied to each of the two regions sandwiching the second scanning line, performing the error diffusion processing sequentially in parallel with either scanning line, using an unprocessed pixel positioned at an intersection of the first scanning line and the second scanning line as a start point.

10. A printer, comprising:
the image processing apparatus according to claim 4.

11. A print instructing terminal to transmit a print instruction to a printer, the print instructing terminal comprising:
the image processing apparatus according to claim 4.

12. An image processing system, comprising:
the printer according to claim 10.

13. An image processing system, comprising:
the print instruction terminal according to claim 11.

* * * * *